PRECISION PULSE DECODER

Filed Aug. 4, 1966 2 Sheets-Sheet 1

INVENTOR.
Howard L. Kennedy

BY
Mueller, Aichele & Rauner
ATTY'S.

INVENTOR.
Howard L. Kennedy

BY
Mueller, Aichele & Rauner

ATTY'S.

United States Patent Office 3,462,740
Patented Aug. 19, 1969

3,462,740
PRECISION PULSE DECODER

Howard L. Kennedy, Phoenix, Ariz., assignor to Motorola, Inc., Franklin Park, Ill., a corporation of Illinois Filed Aug. 4, 1966, Ser. 570,288
Int. Cl. H04q 9/14
U.S. Cl. 340—167 9 Claims This invention relates to a pulse decoder, and more particularly to a decoder which responds with high accuracy to pulses having a predetermined spacing in time.

Pulse decoders are required in certain applications wherein space is at a premium and the decoder must operate over a wide temperature range. One such application is in radar transponders for use on missiles or other aircraft. It is desired that the decoder for such a transponder respond accurately to pulses having a predetermined time spacing and be adjustable to respond to various different pulse spacings. It is also necessary that the unit be compact, require a minimum of power, and be highly reliable in use.

It is, therefore, an object of the present invention to provide an improved, highly accurate pulse decoder.

Another object is to provide a pulse decoder which responds to pulses having a predetermined pulse spacing spacing and which allows a prescribed tolerance in the pulse spacing.

A further object of the invention is to provide a solid state pulse decoder responsive to pulses having predetermined time spacings, and wherein the decoder can be set for any one of a plurality of different pulse spacings.

A feature of the invention is the provision of a pulse decoder which responds to a signal including first and second pulses having a predetermined time spacing, and wherein the first pulse actuates timing circuitry to provide a gate pulse of a predetermined width and the second pulse is passed through the decoder to provide the output pulse when it falls within the period of the gate pulse.

Another feature of the invention is the provision of a pulse decoder for responding to pulses having a predetermined time spacing, wherein the first pulse actuates a multivibrator which applies a voltage to a charging circuit to provide a ramp function and which starts a clock and provides pulses which are superimposed on the ramp to form a composite voltage which is applied to a code selector which resets the multivibrator when the composite signal reaches a predetermined value. The multivibrator when reset produces a gate pulse which passes the second pulse when it falls within a predetermined time period. The code selector is presettable to one of a plurality of voltages to determine which clock pulse acts to reset the selector, so that the gating pulse is applied only at a predetermined time after the first pulse.

The invention is illustrated in the drawings wherein.

In the decoder of the invention, input signals which include a pair of spaced pulses actuate a standard pulse generator which triggers a monostable delay multivibrator. The multivibrator starts a synchronous clock which produces a sinusoidal wave which is shifted in phase and shaped to provide pulses at regularly recurring intervals. The voltage from the multivibrator is applied to a timing circuit and charges a condenser to provide a ramp voltage wave and the pulses from the clock are superimposed on this wave. This wave is applied to a code selector, and when the pulses reach a predetermined amplitude which is set in the code selector, a reset multivibrator is triggered and acts to reset the delay multivibrator. When the delay multivibrator is reset, a gate pulse is formed by an acceptance gate former and applied to the decoding AND gate. A narrow pulse produced by the standard pulse generator is applied to the decoding AND gate and is passed therethrough to provide the output when it falls within the time duration of the gate pulse. The system is triggered by the first pulse of the pair of pulses of the input signal and acts to accept the second pulse of the pair when it falls within a predetermined time interval after the first pulse. The code selector is adjustable to pick the particular clock pulse which determines the time of the gate pulse to set the code, and the gate former controls the width of the gate pulse to set the tolerance for the decoder.

Figure 1:
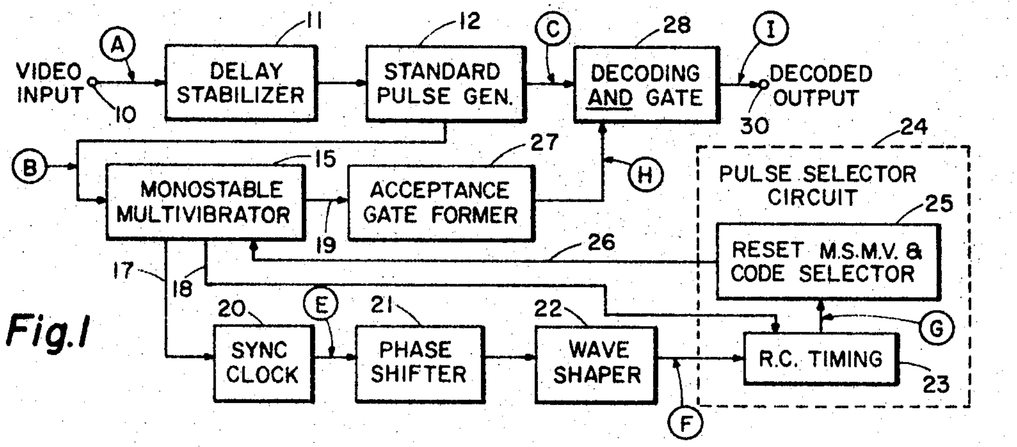
FIG. 1 is a block diagram of the system of the invention.
Figure 2:
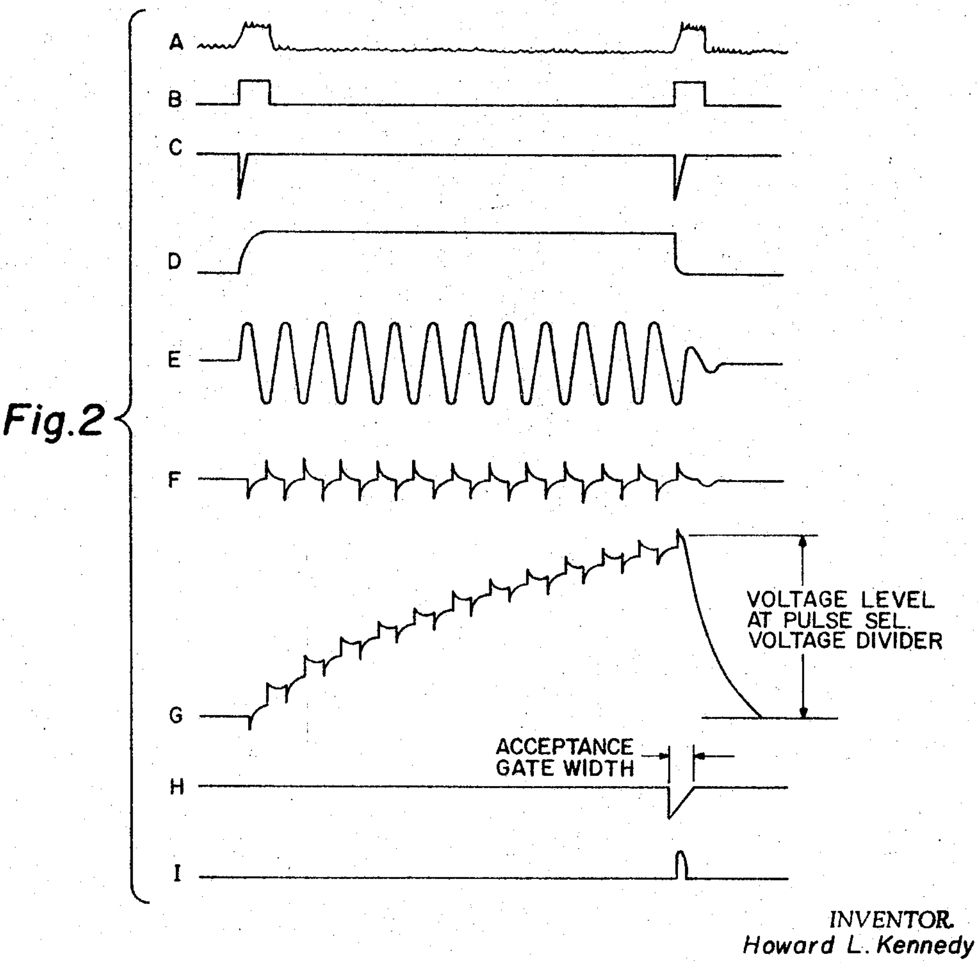
FIG. 2 is a timing chart illustrating the operation of the system of FIG. 1.

The system of FIG. 1 will be described in connection with the timing chart of FIG. 2, with the signals at various points on FIG. 1 being designated by letters which mark the lines in FIG. 2 showing the waveforms. The video input pulse at terminal 10 includes two spaced pulses and the decoder of the invention responds when the spacing between the pulses is a predetermined time interval. The input pulses are applied to delay stabilizer 11 which compensates the delay of the pulses for the amplitudes thereof. The delay stabilizer is described in application Ser. No. 570,637 filed Aug. 5, 1966. The stabilized pulses are applied to standard pulse generator 12 which converts the irregular input pulses to pulses of regular shape. The standard pulse generator 12 has two outputs, with the output on conductor B being regular pulses corresponding generally to the received pulses, as shown on line B of FIG. 2. The pulses at output C are narrow pulses which occur at the leading edge of the received pulses, as shown on line C of FIG. 2.

The standard pulses on conductor B are applied to the monostable delay multivibrator 15 to cause the multivibrator to change from its normal state. This produces voltages on the first and second output conductors 17 and 18 which extend from the multivibrator. The voltage on conductor 17 is applied to synchronous clock 20 and causes the clock to produce output oscillations as shown on line E in FIG. 2. The wave from the clock 20 is applied through phase shifter 21 to wave shaper 22 which converts the wave to a wave of peaked pulses, as shown on line F of FIG. 2.

The output voltage on line 18 from the multivibrator 15, shown by line D in FIG. 2, is applied to timing circuit 23 of the pulse selector circuit 24 and acts to charge a condenser to provide a ramp voltage function. The pulse wave from the wave shaper 22 is also applied to the timing circuit 23 and the pulses are superimposed on the ramp function to provide a composite voltage waveform as shown on line G of FIG. 2. This voltage is applied to the code selector 25 which can be set to be triggered at various different voltage levels. When the composite voltage reaches the level to which the code selector is set, a monostable multivibrator in the code selector is triggered to apply a reset pulse on conductor 26 to the multivibrator 15. This causes the multivibrator 15 to return to its normal or reset condition.

At the time the multivibrator 15 returns to its normal condition, the voltage on output conductor 19 is terminated. This voltage is applied to the acceptance gate former 27 and the termination of the voltage produces a gating pulse. This pulse is shaped by the acceptance gate former 27 to provide a gating pulse having a predetermined width, as shown by line H in FIG. 2. The gating pulse is applied to the decoding AND gate 28 and actuates the AND gate for a predetermined time duration controlled by the width of the gating pulse.

The standard pulse generator 12 applies the narrow pulse at the leading edge of the second input pulse from output C to the decoding AND gate 28. When this input pulse comes within the time period that the AND gate is actuated by the gating pulse, the pulse from output C is passed through the gate 28 to output 30. This is shown on line I of FIG. 2. It is therefore seen that the setting of the code selector determines the time at which the gating pulse will be applied to the decoding AND gate 28, and this will be at a time at which one of the shaped block pulses appears superimposed on the ramp voltage. Accordingly, the gate can be actuated only in coincidence with one of the peaks produced by the shaped clock pulses. The time during which the gate is actuated so that the pulse is applied therethrough depends upon the shape of the gate pulse produced by the acceptance gate former 27. The decoder, therefore, responds to the time spacing between the pulses, and controls the tolerance in spacing between the input pulses which will actuate the decoder.

Figure 3:
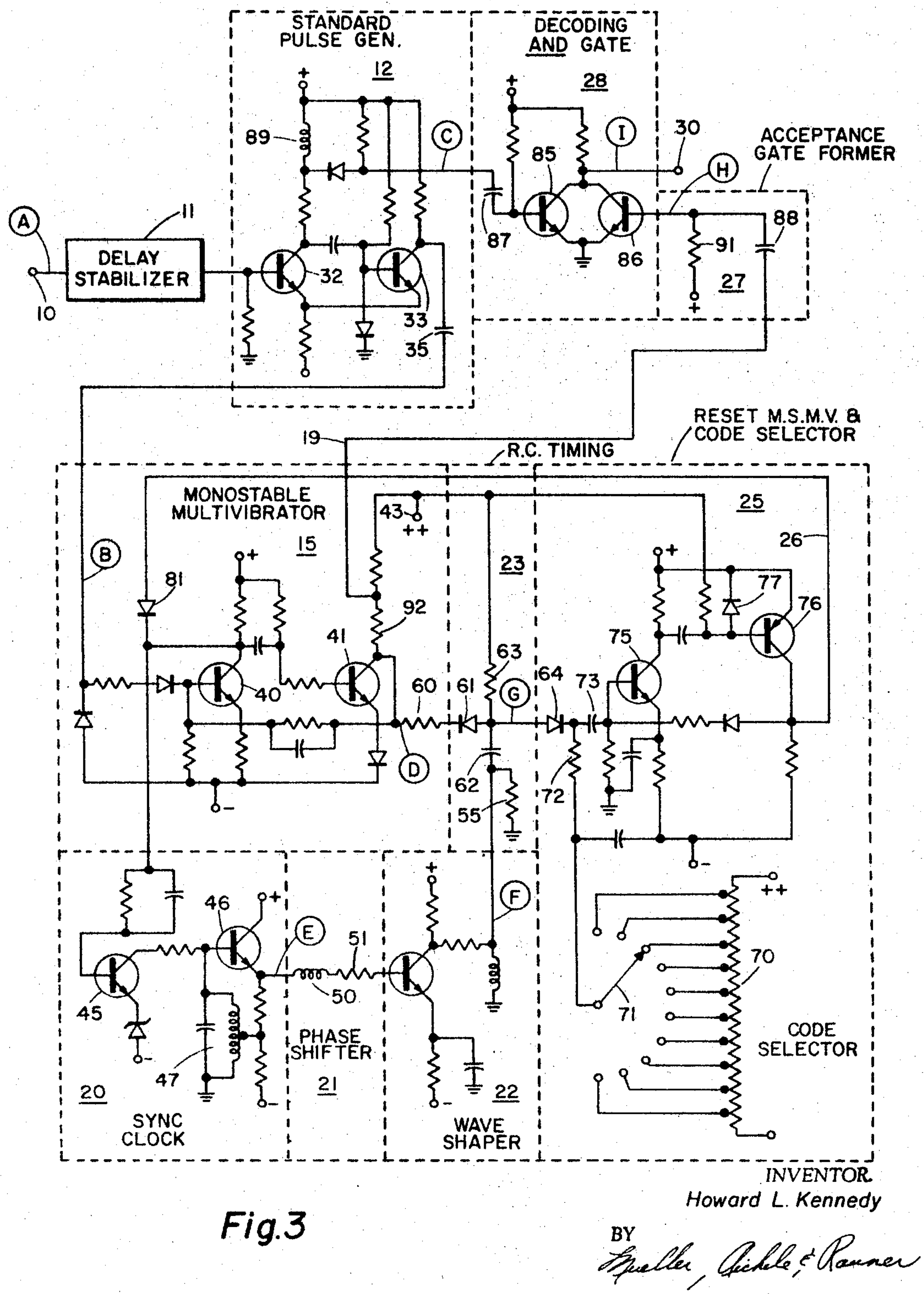
FIG. 3 is a circuit diagram of the system of FIG. 1.

In FIG. 3 there is shown the complete circuit diagram of the decoder. As previously stated, the delay stabilizer 11 is described in co-pending application Ser. No. 570,637. The standard pulse generator 12 includes transistors 32 and 33 connected in an emitter coupled monostable circuit. The circuit is biased so that the generator provides no output until the input reaches a predetermined threshold, and then regenerative action occurs rapidly providing full output. A square wave is derived from the collector of transistor 33 and applied through capacitor 35 to the monostable delay multivibrator 15.

The monostable delay multivibrator 15 includes transistors 40 and 41 connected in a monostable multivibrator circuit which would normally produce a pulse wider than the greatest spacing to be encountered between the two pulses of the received signal. The transistor 40 of the multivibrator is rendered conducting by the applied pulse, and the transistor 41 is cut off. The collector of transistor 40 is connected to the base of transistor 45 of the gated clock 20. Transistor 45 is normally saturated and provides sufficient damping to prevent oscillation of the circuit including transistor 46 and tank circuit 47. When transistor 40 is rendered conducting, the transistor 45 is cut off so that the clock oscillator will operate at a frequency determined by the tank circuit 47 to produce a waveform as shown in line E of FIG. 2. The wave from the clock is shifted in phase by the phase shifter 21 which includes coil 50 and resistor 51. The wave is then applied to pulse shaper 22 which converts the sinusoidal wave to a peaked wave developed across resistor 55, as shown by curve F of FIG. 2.

When the multivibrator 15 is set and the transistor 41 is turned off, the collector of transistor 41 rises to the high positive potential applied at terminal 43. This is applied through resistor 60 back biasing diode 61, allowing capacitor 62 to charge through resistor 63. Accordingly, a ramp voltage is developed across capacitor 62 as it charges, and to this ramp is added the clock pulses developed across resistor 55. This composite voltage is applied to diode 64 which is back biased by the potential applied from code selector 25. Code selector 25 has a tapped resistor 70 which provides a plurality of preset voltage levels. These voltage levels are selectively connected through switch 71 and resistor 72 to the diode 64. When the voltage across the timing circuit including capacitor 62 and resistor 63 exceeds the selected back bias, the diode 64 will conduct and provide a pulse through capacitor 73 to the monostable multivibrator including transistors 75 and 76.

Transistor 75 of the pulse selector is normally conducting and amplifies the pulse applied thereto. When this pulse reaches an amplitude to overcome the threshold established by the clamp diode 77, transistor 76 is rendered conducting to initiate regenerative action between the stages 75 and 76. The collector of transistor 76 is coupled through conductor 26 and diode 81 to the collector of transistor 40 in the multivibrator 15 and acts to reset this multivibrator. This reset action is very sharp and is accurately controlled by the pulses produced by the clock 20.

The decoding AND gate 28 has two inputs one connected to the base of transistor 85, and the other to the base of transistor 86. The leading edge of the pulse from the standard pulse generator 12 is differentiated by inductor 89 to provide a narrow input pulse which is applied through capacitor 87 to the base of transistor 85. Transistor 85 is normally saturated, and the application of the input pulse causes it to be cut off. However, no output is produced by transistor 85 because its collector is clamped by transistor 86.

When the multivibrator 15 is in the set condition, the positive potential at the collector of transistor 41 is coupled through conductor 19 and capacitor 88 to the base of transistor 86, which causes the base current to increase. Since transistor 86 is already in a saturated state, this increased base current causes no change in the collector current, but causes capacitor 88 to rapidly charge. When the multivibrator 15 is reset and the voltage applied to capacitor 88 drops, this capacitor discharges through resistors 91 and 92, and through transistor 41 to provide the pulse shown on line H of FIG. 2. This turns off the transistor 86 for a period of time determined mainly by the RC time constant of the gate former 27 and the amplitude of the voltage change on conductor 19. This permits the second pulse C from the standard pulse generator to produce an output at terminal 30 when applied at the input of transistor 85. The second pulse B from the standard pulse generator is prevented from retriggering the monostable multivibrator 15 by the reset pulse on line 26 from the monostable multivibrator of the code selector, the width of which is greater than the acceptance gate width.

It is therefore seen that the pulse decoder of the invention responds to pulses having a predetermined spacing, with the spacing being selectable at any one of a plurality of values. Since the code selector responds to the sharp peaks of pulses produced by the clock, the selection of the code is highly accurate. A desired latitude of pulse spacing is provided by providing a gating pulse at the output AND gate having a desired pulse width. The circuit can be provided in compact form as required for a radar transponder for use on aircraft.

What is claimed is:

1. A pulse decoding system responsive to a signal including first and second pulses having a predetermined spacing, said system including in combination, first means responsive to the signal for providing a regular pulse in response to each of the first and second pulses of the signal, multivibrator means having set and reset inputs and first and second output means, means connecting said first means to said set input for applying thereto said regular pulses so that said multivibrator means is set by the regular pulse associated with the first pulse and acts to produce signals at said first and second outputs, clock means for producing pulses at regularly recurring intervals connected to said first output means and rendered operative by the signal from said multivibrator means, a timing circuit connected to said second output means and to said clock means for providing a composite voltage wave including a ramp component having pulses from said clock means superimposed thereon, pulse selector means connected to said timing circuit for producing a reset pulse when said composite voltage wave reaches a predetermined level, means applying said reset pulse to said reset input of said multivibrator means for returning the same to reset condition, gate means having a first input connected to said first means for receiving said regular pulses therefrom and a second gate input, and means coupled to said second output means of said multivibrator means and to said gate input for producing a gating pulse when said multivibrator means is reset and applying said gating pulse for actuating said gate means for a predetermined time duration to thereby control the time during which the regular pulse associated with the second pulse is passed by said gate means.

2. The pulse decoding system of claim 1 wherein said first means includes first and second outputs, with said first output providing rectangular pulses which are applied to said set input of said multivibrator means and said second output providing narrow pulses which are applied to said first input of said gate means.

3. The pulse decoding system of claim 1 wherein said clock means includes a synchronous oscillator, phase shifter means connected to said oscillator, and pulse shaper means connected to said phase shifter means, with said pulse shaper means being connected to said timing circuit for applying pulses thereto.

4. The pulse decoding system of claim 1 wherein said timing circuit includes a capacitor which is charged by action of a voltage applied from said second output means of said multivibrator means when said multivibrator means is set, and resistor means connected in series with said capacitor means to which pulses from said clock means are applied.

5. The pulse decoding system of claim 1 wherein said pulse selector means includes a diode, voltage divider means having a plurality of taps providing different direct current voltages, and switch means selectively connecting said taps to said diode to provide a back bias therefor, with said composite voltage wave being applied to said diode for causing the same to conduct when said voltage wave exceeds the back bias voltage applied thereto.

6. The pulse decoding system of claim 5 wherein said pulse selector means includes a monostable multivibrator which is triggered by the pulse applied through said diode to provide a sharp reset pulse for said reset input.

7. The pulse decoding system of claim 1 wherein said last recited means includes a capacitor which is charged from the voltage at said second output means of said multivibrator means when said multivibrator means is set, and which is discharged to produce said gating pulse when said multivibrator means is reset, and said gate means includes first and second transistors each having base, emitter and collector electrodes, with said emitter electrodes being connected together, and resistance means connected in common to said collector electrodes, and said first input is connected to said base electrode of said first transistor and said second gate input is connected to said base electrode of said second transistor, wherein said gating pulse acts to cut off said second transistor, so that cut off of said first transistor by said regular pulse applied to said base electrode causes an output pulse to be generated across the resistor means connected in common to said collector electrodes.

8. A pulse decoding system responsive to a signal including first and second pulses having a predetermined spacing, said system including in combination, first means responsive to the signal for providing a trigger pulse and an output pulse in response to the first and second pulses of the signal respectively, multivibrator means having set and reset inputs and first and second outputs, means connecting said first means to said set input for applying thereto said trigger pulse for setting said multivibrator, clock means for producing pulses at regularly recurring intervals connected to said first output and rendered operative when said multivibrator is set, a timing circuit including a first resistor, a capacitor and a second resistor connected in series, means coupled to said second output for causing said capacitor to be charged through said first and second resistors when said multivibrator means is set, said second resistor being connected to said clock means so that pulses from said clock means are applied thereto, pulse selector means connected to said timing circuit for producing a reset pulse when the composite voltage wave across said capacitor and said resistor in series reaches a predetermined, level, means applying said reset pulse to said reset input of said multivibrator for returning the same to reset condition, gate means having a first input connected to said first means for receiving said output pulses and a second gate input, and timing means coupled to said second output of said multivibrator and to said gate input for producing a gating pulse when said multivibrator means is reset and applying the same to said gate input, said gating pulse having a predetermined width to actuate said gate means over a predetermined time duration to thereby control the time during which said output pulse is passed by said gate means.

9. The pulse selector system of claim 8 wherein said clock means includes pulse shaping means which produce pulses with sharp peaks, and said pulse selector means includes selective means for setting different reference voltages, with said composite voltage wave exceeding the set reference voltage when the sharp peak of a pulse occurs so that the resetting of said multivibrator takes place at times determined by the time of occurrence of said sharp peaks.

References Cited

UNITED STATES PATENTS

| | | | |
|---|---|---|---|
| 3,187,261 | 6/1965 | Matsushima | 307—234 XR |
| 3,395,353 | 7/1968 | King | 307—234 XR |

DONALD J. YUSKO, Primary Examiner

U.S. Cl. X.R.

307—234; 328—111